United States Patent [19]

Lewis

[11] Patent Number: 5,576,039
[45] Date of Patent: Nov. 19, 1996

[54] COLORED JELLY-TYPE SUBSTANCE, METHOD OF PREPARATION, AND COMPOSITION CONTAINING SAME

[75] Inventor: James A. Lewis, Park Ridge, N.J.

[73] Assignee: Bush Boake Allen Inc.

[21] Appl. No.: 383,038

[22] Filed: Feb. 3, 1995

[51] Int. Cl.⁶ ............................... A23L 1/054; A23L 2/00
[52] U.S. Cl. ......................... 426/250; 426/573; 426/590
[58] Field of Search ..................................... 426/573, 575, 426/576, 577, 578, 590, 250, 540, 590

[56] References Cited

U.S. PATENT DOCUMENTS

| | | | |
|---|---|---|---|
| 2,821,479 | 1/1958 | Forkner | 426/573 |
| 3,615,645 | 10/1971 | Forkner | 426/573 |
| 3,734,745 | 5/1973 | Cassanelli et al. | 426/575 |
| 3,892,870 | 7/1975 | Wood | 426/573 |
| 3,947,604 | 3/1976 | McGinley et al. | 426/573 |
| 3,969,536 | 7/1976 | Ikeda et al. | 426/573 |
| 4,500,552 | 2/1985 | Kadison et al. | 426/576 |
| 4,503,084 | 3/1985 | Baird et al. | 426/573 |
| 4,647,470 | 3/1987 | Sanderson et al. | 426/573 |
| 4,759,936 | 7/1988 | Best et al. | 426/575 |
| 4,894,250 | 1/1990 | Musson et al. | 426/575 |
| 5,213,834 | 5/1993 | Ikeda et al. | 426/573 |
| 5,236,730 | 8/1993 | Yamada et al. | 426/573 |
| 5,260,083 | 11/1993 | Brain et al. | 426/573 |
| 5,294,457 | 3/1994 | Jenkins et al. | 426/573 |
| 5,376,396 | 12/1994 | Clark | 426/573 |
| 5,387,427 | 2/1995 | Lawrence et al. | 426/573 |
| 5,417,990 | 5/1995 | Soedjak et al. | 426/575 |

FOREIGN PATENT DOCUMENTS

| | | |
|---|---|---|
| 0479126 | 4/1992 | European Pat. Off. . |
| 2168366 | 6/1986 | United Kingdom . |
| 2219803 | 12/1989 | United Kingdom . |

*Primary Examiner*—Jeanette Hunter
*Attorney, Agent, or Firm*—Beth Kovitz Fields; Charles A. Gaglia; Wendy A. Choi

[57] ABSTRACT

A jelly-type substance incorporating a water-insoluble color is provided. The colored jelly-type substance can be incorporated in a liquid composition having an acidic pH between about 2.5 and 6.0 and the color will remain incorporated in the jelly-type substance. A liquid composition including the jelly-type substances and a method for incorporating the water-soluble colors in the jelly-type substance are also provided.

7 Claims, No Drawings

COLORED JELLY-TYPE SUBSTANCE, METHOD OF PREPARATION, AND COMPOSITION CONTAINING SAME

FIELD OF THE INVENTION

This invention relates generally to jelly-type substances and in particular, to a colored jelly-type substance that can be incorporated into liquid compositions.

BACKGROUND OF THE INVENTION

Jelly drinks have been known for a long time. For example, Black Grass jelly drink is a traditional Chinese jelly drink. This led to the idea that pieces or bits of a jelly-type substance could be used in a liquid composition to give eye appeal, texture and other aesthetic advantages.

Jelly-type substances of the type referred to herein are hydrated hydrocolloids that can be incorporated into liquid compositions. In particular, liquid beverages are generally acidic and usually have a pH between about 2.5 and 6.0.

Japanese Patent Application No. 03130061 filed on Jun. 3, 1991 discloses manufacturing methods for gel-containing acidic cold beverages. The gel particles disclosed therein are transparent and are suspended, for example, in a fruit juice beverage or a coffee drink.

It is difficult to color jelly-type substances that are to be incorporated into beverages because the color leaches into the surrounding liquid. Specifically, water soluble colors that might be used to color jelly-type substances will leach out into the surrounding beverage at an acidic pH. Since the only artificial colors that are permitted for general use in the food industry in the United States are water soluble, artificial colors are not useful for coloring jelly-type substances.

Lake colors are water soluble colors that have been precipitated onto an aluminum hydroxide support and are generally considered to be water-insoluble. However, lake colors are only water-insoluble at a neutral pH. At a low pH, such as that found in most beverages, the alumina dissolves and the water soluble color diffuses into the surrounding liquid beverage.

It would, therefore, be desirable to incorporate a stable color into a jelly-type substance so that the jelly-type substance can be incorporated into a liquid composition at an acidic pH.

It is a goal of the invention to provide colored jelly-type substances.

It is another goal of the invention to provide colored jelly-type substances that can be incorporated into liquid compositions.

It is a further goal of the invention to provide colored jelly-type substances wherein the color is stable when the substance is incorporated into a liquid composition having an acidic pH.

Still other goals and advantages of the invention will in part be obvious and will in part be apparent from the specification.

SUMMARY OF THE INVENTION

Generally speaking, a jelly-type substance incorporating a water-insoluble color is provided. The colored jelly-type substance can be incorporated in a liquid composition having an acidic pH between about 2.5 and 6.0 and the colors will remain incorporated in the jelly-type substance. A liquid composition including these jelly-type substances and a method for incorporating the water-insoluble colors in the jelly-type substance are also provided.

The invention accordingly comprises the compositions possessing the features, properties, and the relation of components, along with the several steps and the relation of one or more of such steps with respect to each of the others, which are exemplified in the following detailed disclosure, and the scope of the invention will be indicated in the claims.

DETAILED DESCRIPTION OF THE PREFERRED EMBODIMENTS

The present invention relates to jelly-type substances incorporating water-insoluble colors. As used herein, the term "jelly-type substance" is used in a broad sense to refer to any hydrated hydrocolloid. Jelly-type substances that are useful for incorporation into liquid compositions in accordance with the present invention are those that gel irreversibly.

Such jelly-type substances can be prepared by mixing water and a suitable gelling agent to form a liquid composition. The liquid composition can be gelled by heating and then cooling the composition. Alternatively, the liquid composition can be gelled by reacting the composition with mono- or di-valent ions such as calcium or sodium ions.

The water must be potable and is present in an amount between about 80% and 99.8% by weight of the substance.

Suitable gelling agents include, but are not limited to, gellan gum, xanthan gum, locust bean gum, pectin, alginates, carragheenans, starches, gelatin, and mixtures thereof. The gelling agent is used in an amount between about 0.1% and 5% by weight of the substance, preferably between about 0.2% and 1% by weight. In a preferred embodiment, gellan gum is used in an amount between about 0.1% and 0.5% by weight of the substance, preferably between about 0.2% and 0.4% by weight.

Jelly-type substances prepared using gellan gum are soft and break up immediately in the mouth. In addition, such substances are pasteurizable because the substance does not redissolve on heating. Finally, the texture of the jelly-type substance can be altered by varying the proportions of other gelling agents that are used in addition to the gellan gum as well as other components of the substance.

Other water soluble components that may be included in the jelly-type substance include, for example, sweeteners, acids, ion providers or buffers, sequestrants, preservatives, and the like. The texture of the jelly-type substance is a function of the components of the substance and their proportions and is measured using standards of elasticity, brittleness, hardness, modulus and cohesiveness.

For example, carbohydrate sweeteners may be used to aid in dispersion of the gelling agent. In addition, the sweetener can also weight the jelly-type substance so that pieces of the substance do not float when incorporated into a liquid composition.

When sweeteners are utilized, the present invention contemplates the inclusion of those sweeteners well known in the art, including both natural and artificial sweeteners. Thus, sweeteners may be chosen from the following non-limiting list: sugars such as sucrose, glucose (corn syrup), dextrose, invert sugar, fructose, and mixtures thereof; saccharine and its various salts such as the sodium or calcium salt; cyclamic acid and its various salts such as the sodium salt; the dipeptide sweeteners such as aspartame; dihydrochalcone; glycyrrhizin; Stevia rebaudiana (Stevioside); and sugar alcohols such as sorbitol, sorbitol syrup, mannitol, xylitol, and the like. Also contemplated as an additional sweetener is the nonfermentable sugar substitute (hydrogenated starch hydrolysate) which is described in U.S. Reissue Pat. No. 26,959. Also contemplated is the synthetic sweetener 3,6-dihydro-6-methyl-1-1,2,3oxathiazin-4-one-2,2-dioxide particularly the potassium (Acesulfame-K), sodium and calcium salts thereof as described in German Patent No. 2,001,017.7.

The sweetener can be used in solid or in dissolved form and, when used, is generally present in an amount between about 0.1% and 20% by weight of the substance depending on the physical properties of the jelly-type substance that are desired.

Acids can be selected from food approved organic acids. For example, citric acid, maleic acid, tartaric acid, fumaric acid, lactic acid, and mixtures thereof can be used. When used, the acid is present in an amount between about 0.05% and 0.5% by weight of the substance, preferably between about 0.1% and 0.25% by weight.

A buffer can be selected from food approved buffering agents, including, for example, sodium citrate, potassium citrate, calcium acetate, and mixtures thereof. The buffer is used in an amount between about 0.02% and 0.2% by weight of the substance, preferably between about 0.05% and 0.1% by weight.

Sequestrating agents are used when necessary to correct ion imbalances that may be present in the water. Such an ion imbalance can cause difficulties with gellation such as a failure of the liquid composition including water and gelling agent to gel or premature gelling of the composition.

A preservative such as sodium benzoate, potassium sorbate, and mixtures thereof is optionally used in the substance. When used, the preservative is present in an amount up to 0.1% by weight.

In addition, a water-insoluble color is used in the preparation of the jelly-type-substance in accordance with the invention. Suitable water-insoluble colors include, but are not limited to, annatto (yellow), curcumin (yellow), beta-carotene (yellow), carmine (red), and mixtures thereof.

Suitable water-insoluble colors also include colored natural materials such as oleoresins and pigments. Exemplary natural materials include, but are not limited to, chlorophyll (green), titanium dioxide (white), carbon black (black), cocoa powder (brown), paprika (red), spinach (green), and mixtures thereof.

The water insoluble colors are generally provided as a suspension in water or other suitable liquid media. Other suitable media include, but are not limited to, propylene glycol, vegetable oil, ethyl alcohol, and the like. In a preferred embodiment, a suspension or emulsion having between about 1% and 10% by weight water-insoluble color is used.

The final amount of color is, of course, determined by the final color of the jelly-type substance that is desired and manipulation of the amount of color required to achieve a desired result can readily be accomplished by one skilled in the art. In general, the amount of color will range between about 0.002% and 1% by weight of the jelly-type substance depending on the particular water-insoluble color that is used and the final color that is desired.

Exemplary amounts of some of the water-insoluble colors that would be considered to give attractive colors would be between about 0.01% and 0.04% by weight of carmine based on the total weight of the jelly-type substance, between about 0.002% and 0.02% by weight of beta-carotene based on the total weight of the jelly-like substance, and between about 0.6% and 1% by weight of cocoa powder based on the total weight of the jelly-type substance. Of course, a lesser amount of the water-insoluble color gives a lighter final color and a greater amount of the water-insoluble color gives a darker final color.

To prepare the colored jelly-type substance in accordance with the invention, all of the dry materials, with the exception of the color, are blended and added to the water. The water and dry materials are stirred until a homogeneous dispersion is formed. The temperature of the dispersion is raised to between about 160° and 190° F. and maintained at that temperature until the gum is fully hydrated. The solution will be clear when the gum is fully hydrated.

The water-insoluble color is added in liquid form. If required, a suitable acid such as citric acid is added to bring the pH to between about 3.5 and 4.0. The mixture is cooled to between about 140° and 150° F., poured into a container, and allowed to set. After the jelly-like substance has set, it can be cut into any desired shape by conventional means that are well known to those skilled in the art. The cut jelly-like substance can be preserved by the addition of a preservative such as sodium benzoate.

In an alternate embodiment, the jelly-like substance is prepared using excess buffer. This prevents the liquid composition from gelling when it is cooled. The resulting liquid composition is then gelled by contacting the composition with a solution of a suitable mono- or di-valent salt such as calcium chloride or sodium chloride. In a further alternate embodiment, the composition is gelled by contacting the composition with a strong acid solution such as a 2% solution of citric acid in water.

The cut pieces of jelly-like substance can be incorporated in a liquid composition having a pH between about 2.5 and 6 in an amount between about 1% and 10% by weight of the composition, preferably in an amount between about 5% and 8% by weight. The liquid composition can be hot or cold, carbonated or non-carbonated, alcoholic or non-alcoholic, caffeinated or non-caffeinated, clear or cloudy. Suitable liquid compositions include, but are not limited to, soda, coffee, tea, beer, milk, mouthwash, and the like. The jelly-like substance remains discrete and retains its color during and subsequent to processing of the liquid composition.

The following Examples are presented for purposes of illustration only and are not to be construed in a limiting sense.

EXAMPLE 1

Nine hundred (900) mls. of cold water were measured into a weighed glass beaker. A dry blend of 80 g granulated sucrose, 4 g gellan gum, 1 g sodium citrate, and 1 g sodium benzoate was prepared and slowly added to the water with agitation. When all of the ingredients were suspended in the water, the temperature was raised to 180° F. with gentle stirring.

The liquid was maintained at 180° F. for about 10 minutes until visual inspection indicated that hydration of the gum was complete. A suspension of 0.28 g carmine powder in 5.32 ml water was added and the mixture was stirred until complete dispersion of the color was achieved. The heat source was removed and the beaker was cooled in a cold water bath until a temperature of 150° F. was achieved. A solution of 1.7 g anhydrous citric acid in 10 ml water was added with agitation and the contents of the beaker were brought up to 1000 g with water. The resultant red liquid was poured onto a flat smooth impervious surface fenced at 44 mm per side to a depth of approximately 5 mm.

The red liquid was allowed to cool to ambient room temperature and formed a jelly-type substance. The jelly-type substance was cut into 5 mm cubes using a suitable roller-cutter.

The resulting pieces of jelly-type substance were incorporated into a non-carbonated beverage at a level of 5% by weight. The beverage was bottled, capped, and pasteurized at 180° F. for ten (10) minutes and cooled.

EXAMPLE 2

Nine hundred and ninety-three (993) ml water were measured into a suitable container. The water was agitated and 2 g gellan gum together with 1.3 g sodium citrate were added. Agitation was continued until the gum was thoroughly dispersed. Four (4) ml of a 0.7% suspension of beta-carotene in water was added and dispersed thoroughly.

The resulting orange-yellow liquid was heated to 120° F. in order to fully hydrate the gum and the liquid was cooled to ambient room temperature, approximately 68° F. The liquid remained mobile and was poured into a suitable burette for producing small droplets. Droplets of a suitable size were allowed to form and were dropped into an agitated bath of 1½% calcium chloride solution. The droplets hardened into discrete and easily handlable spheres on contact with the calcium chloride solution. The spheres were removed from the solution with a suitable mesh, washed clean of surface calcium chloride, and used in beverages as described in Example 1.

EXAMPLE 3

Brown colored jelly spheres were prepared as described in Example 2, except that 12 g of a 50% slurry of cocoa powder defatted was used in place of the beta-carotene in water.

EXAMPLE 4

White jelly cubes were prepared as described in Example 1, except that a suspension of 1.5 g titanium dioxide in 8.5 ml water was used in place of the carmine powder.

It will thus be seen that the goals set forth above, among those made apparent from the preceding description, are efficiently attained and, since certain changes may be made in carrying out the above process and in the composition set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A method of preparing a colored gel comprising:

preparing a liquid composition including between about 80% and 99.8% by weight water and between about 0.1% and 5% gelling agent including at least gellan gum;

heating the liquid composition until the gelling agent is fully hydrated to obtain a heated liquid composition;

adding between about 0.002% and 1% by weight water-insoluble color to the heated liquid composition to obtain a color-containing liquid composition; and cooling the color-containing liquid composition, to form a colored gel that can be incorporated into an acidic liquid and subjected to high heat pasteurization without deterioration or color migration.

2. The method of preparing a colored gel of claim 1 wherein the water-insoluble color is selected from the group consisting of annatto, curcumin, beta-carotene, carmine, chlorophyll, titanium dioxide, carbon black, cocoa powder, paprika, spinach, and mixtures thereof.

3. The method of preparing a colored gel of claim 1 wherein the liquid composition further includes a buffer selected from the group consisting of sodium citrate, potassium citrate, calcium acetate, and mixtures thereof.

4. The method of preparing a colored gel of claim 3 further comprising contacting the color-containing liquid composition with a salt selected from the group consisting of calcium chloride, sodium chloride, and mixtures thereof, after cooling.

5. The method of preparing a colored gel of claim 3 further comprising contacting the liquid composition with citric acid, after cooling.

6. A liquid beverage comprising:

an acidic liquid having a pH between 2.5 and 6.0; and, a colored gel including between about 80% and 99.8% by weight water, between about 0.1% and 5% by weight gelling agent including at least gellan gum; and between about 0.002% and 1% by weight water-insoluble color, wherein the colored gel can be incorporated into the acidic liquid and subjected to high heat pasteurization without deterioration or color migration.

7. The liquid beverage of claim 6 wherein the water-insoluble color is selected from the group consisting of annatto, curcumin, beta-carotene, carmine, chlorophyll, titanium dioxide, carbon black, cocoa powder, paprika, spinach, and mixtures thereof.

\* \* \* \* \*